United States Patent [19]

Yu

[11] Patent Number: 5,939,486

[45] Date of Patent: Aug. 17, 1999

[54] ELECTROSTATOGRAPHIC CLEANING APPARATUS

[75] Inventor: Robert C. U. Yu, Webster, N.Y.

[73] Assignee: Xerox Corporation, Stamford, Conn.

[21] Appl. No.: 08/922,097

[22] Filed: Sep. 2, 1997

[51] Int. Cl.$^6$ .............................. C08K 5/17; C08K 5/15; C08G 18/08
[52] U.S. Cl. ............................ 524/722; 524/751; 528/48; 528/49
[58] Field of Search .................................. 524/722, 751; 528/48, 49

[56] References Cited

U.S. PATENT DOCUMENTS 5,270,430  12/1993  Parrish ........................ 528/49

*Primary Examiner*—Kriellion S. Morgan

[57] ABSTRACT

A process for fabricating an electrostatographic cleaning member including forming a liquid mixture of a non-carbonaceous organic antioxidant uniformly distributed in a liquid prepolymer polyol, or in a liquid di-isocyanate, or in both the prepolymer polyol and the di-isocyanate, combining and reacting the prepolymer polyol with the di-isocyanate to form a cleaning member including a crosslinked thermoset polyurethane elastomer matrix reaction product in which the antioxidant is uniformly distributed.

7 Claims, 2 Drawing Sheets

ELECTROSTATOGRAPHIC CLEANING APPARATUS

BACKGROUND OF THE INVENTION

The present invention relates, in general, to an electrostatographic image forming apparatus, and more specifically, to a system for cleaning of residual toner, dirt particles, and other debris from or for preventing contamination of a charge retentive belt or drum surface of an image forming or holding electrophotographic imaging member.

In electrophotographic imaging applications such as xerography, a charge retentive photoreceptor belt or drum is electrostatically charged according to the image to be produced. In a digital printer, an input device such as a raster output scanner controlled by an electronic subsystem can be adapted to receive signals from a computer and to transpose these signals into suitable signals so as to record an electrostatic latent image corresponding to the document to be reproduced on the photoreceptor. In a digital copier, an input device such as a raster input scanner controlled by an electronic subsystem can be adapted to provide an electrostatic latent image to the photoreceptor. In a light lens copier, the photoreceptor may be exposed to a pattern of light from an original image to be reproduced. In each case, the resulting pattern of charged and discharged areas on photoreceptor form an electrostatic charge pattern (an electrostatic latent image) conforming to the original image.

The electrostatic image on the photoreceptor may be developed by contacting it with a finely divided electrostatically attractable toner. The toner is held in position on the photoreceptor image areas by the electrostatic charge on the surface. Thus, a toner image is produced in conformity with a light image of the original beam reproduced. Once each toner image is transferred to a substrate, the image is affixed thereto form a permanent record of the image to be reproduced. In the case of multicolor copiers and printers, the complexity of the image transfer process is compounded, as four or more colors of toner may be transferred to each substrate sheet. Once the single or multicolored toner is transferred to the substrate, it is permanently affixed to the substrate sheet by fusing so as to create the single or multicolor copy or print.

Subsequent to the photoreceptor to substrate toner transfer process, it is necessary to at least periodically clean the charge retentive surface of the photoreceptor. In order to obtain the highest quality copy or print image, it is generally desirable to clean the photoreceptor surface each time after the toner image is transferred to a substrate or receiving member. In addition, other particles such as paper fibers, dirt debris, toner additives and other impurities (hereinafter collectively referred to as "residue") may remain on the charged surface of the photoreceptor after transfer. Cleaning blades and brushes may be employed to remove residue from a photoreceptor surface. Typical polymeric materials used for cleaning blade application include thermoplastic and thermoset polyurethane elastomers, silicones, polybutadiene, vitons, polyphosphazines, polyvinyl chlorides, polyacrylates, polycarbonates, and the like. In practice, an elastomeric polyurethane blade is generally preferred and used to scrape debris residue from the photoreceptor surface. A rotating cleaning brush, may also be used to remove, loosen, dislodge, abrade or otherwise clean unwanted toner and other residue from the photoreceptor surface.

When using a cleaning blade of polymeric material, such as an elastomeric polyurethane blade to clean residue toner particles and debris from the surface of an organic photoreceptor belt or drum, a fraction of the corona species emitted from the photoreceptor charging device has been found to be adsorbed by the blade during the electrophotographic imaging process. These corona species outgas from the blade matrix during the period when the imaging machine is idled. This outgassing of corona species causes a variety of problems, such as copy deletion print defects originating at the location on the photoreceptor where the blade previously rested on the surface of the photoreceptor. This copy deletion print defect problem includes visible inboard-outboard transverse defect lines in copies and prints corresponding to the exact location where the blade and photoreceptor were in intimate contact during the period when the machine was in idle. Prior art solutions have included the use of a mechanical system to retract the cleaning blade away from the photoreceptor surface when the machine is in idle in order to prevent the blade and photoreceptor from remaining in contact. This retraction of the cleaning blade eliminates the cause of chemical attacks by out-gassing of corona species which degrade the photoreceptor. Such blade retraction mechanisms can add costs and complexity to the imaging system and may also create new problems. Thus, it is desirable to avoid using a blade retraction system and focus on an approach which can not only reduce manufacturing costs, but also eliminate the frequent need of service call and repair requirements associated with using such a device. Unfortunately, elimination of such a blade retraction system can lead to an undesirable residue spots printout problem that can be observed on final copies.

During xerographic imaging and cleaning processes, it has been found that the elastomeric cleaning blade polymer matrix absorbs and cumulatively stores a substantial amount of corona species discharged from the charging devices. Similarly, when intermediate transfer members (drums or belts) are used in an electrostatographic imaging process, they may also be affected by the corona species. Any device proximate to or in periodic or continuous contact with an imaging member (such as a bias transfer roll, a plastic housing used for cleaning or some other purpose) may contribute to degradation of an image forming or holding member. Such devices include intermediate transfer members and bias transfer members. Intermediate transfer members and bias transfer members are well known and described, for example, in U.S. Pat. No. 5,119,140, the entire disclosure thereof being incorporated herein by reference.

The corona species may be emitted from high voltage charging devices such as corotrons and scorotrons. The corona species absorbed by the cleaning blade can subsequently outgas from the cleaning blade and chemically attack the electrically active components in the photoreceptor. This attack may occur at the location where blade tip/edge and photoreceptor surface are in prolonged intimate contact thereby causing repetitive development of narrow areas of print defect corresponding to the chemically damaged regions of the photoreceptor. The print defects are manifested as deletion bands or solid line defects on printout copies, depending on the development system employed in the copier or printer. The damage to the photoreceptor can be long lived and even may be permanent. Generally, the only way to correct this problem is by costly outright replacement of both the photoreceptor and the cleaning blade. In some cases, the copy print defect may appear only after a few thousand copies. Therefore, for a photoreceptor having a long projected target life, such a premature failure represents an unacceptable major component life setback.

Attempts to resolve the corona species chemical attack issue have been proposed and tested over the years. Although antioxidant cleaning blade impregnation has been disclosed, the described process involves antioxidant impregnation of the blade by swelling and deswelling a blade in a thermodynamically good solvent containing dissolved antioxidant. This impregnation process is cumbersome, costly, slow and undesirable for production implementation. Moreover, the swelling/deswelling process involves large volumes of organic solvent waste which require safe disposal. Still another disadvantage noted during the deswelling step carried out in air ambient was that rapid solvent evaporation from the blade surface often created large instantaneous tension stress at the blade surface due to contraction caused by quick lost of solvent which led to cracking and fracture of the blade.

INFORMATION DISCLOSURE STATEMENT

U.S. Pat. No. 5,610,699 issued Mar. 11, 1997 to Yu et al. (corresponding Japanese Application No. 08-054813, published Feb. 27, 1996)—Photoreceptor cleaning apparatus and method are disclosed involving swelling/deswelling of a cleaning blade in a solution containing an antioxidant to impregnate the blade with the antioxidant. Also disclosed is the external application of a dispersed active graphite coating to the blade surface.

U.S. Pat. No. 5,264,903 issued Nov. 23, 1993 to Nagame et al discloses a cleaning unit for use in an image-formation apparatus including a photoconductor, provided with a cleaning member which can be brought into contact with the surface of the photoconductor and is made of an activated carbon fiber as the main component.

U.S. Pat. No. 5,208,639 issued May 4, 1993 to Thayer et al discloses an apparatus for cleaning residual toner and debris from a moving charge retentive surface of an image forming apparatus. The invention includes a multiple blade holder for selectively indexing each individual blade into position for cleaning the moving photoreceptor. The blade holder contains a number of cleaning blades mounted radially from a central core; by rotating the holder about its longitudinal axis a new cleaning blade is moved by the indexing device into the cleaning position to replace a failed blade. The indexing device removes the failed cleaning blade and positions a new cleaning blade in frictional contact with the photoreceptor for cleaning.

U.S. Pat. No. 5,138,395 issued Aug. 11, 1992 to Lindblad et al discloses a cleaning blade which is made from a thermoplastic material having a compounded additive for lubrication. The cleaning blade is used in an electrophotographic printing machine to remove residual particles from a photoconductive surface.

U.S. Pat. No. 5,153,657 issued Oct. 6, 1992 to Yu et al discloses a blade member impregnated with inorganic particulates dispersed therein so as to reinforce the blade for improving blade life.

U.S. Pat. No. 4,875,081 issued Oct. 17, 1989 to Goffe et al discloses a blade member for cleaning a photoreceptor wherein an A.C. voltage is applied to the cleaning blade. Use of the A.C. voltage eliminates the need to bias the blade against the photoreceptor with a high frictional force and thus eliminates impaction of toner on the photoreceptor surface.

U.S. Pat. No. 4,864,331 issued Sep. 5, 1989 to Boyer et al discloses an offset electrostatic imaging process which includes the steps: (a) forming a latent electrostatic image on a dielectric imaging member, with the dielectric imaging member being prepared by coating an electrically conductive substrate with a porous layer of a non-photoconductive metal oxide using a deposition process; (b) developing the latent electrostatic image with a developer material which comprises a silicone polymer and from about 0.5 to about 5 percent by weight of a metal salt of a fatty acid; (c) transferring the developed image to an image receiving surface by applying pressure between the dielectric imaging member and the image receiving surface; (d) cleaning the dielectric imaging member using a first cleaning means which is effective to remove developer material residue from about the surface of the porous oxide layer; and (e) further cleaning the dielectric imaging member using a second cleaning means which is effective to remove developer material residue from the pores below the surface of the oxide layer.

U.S. Pat. No. 4,835,807 issued Jun. 6, 1989 to Swift discloses a cleaning brush for use in electrophotographic copying machines, printers or the like in which carbon black is suffused in the fibers of a polymer-bristled brush to enhance the conductivity of those fibers.

U.S. Pat. No. 4,823,161 issued Apr. 18, 1989 to Yamada et al. discloses a cleaning blade for use in electrophotographic copying machines, facsimile machines, printers or the like which is characterized in that it has a double-layer structure and comprises a contact member made of a poly (urethane)ureamide polymer and to be held in contact with a toner image bearing member, and a support member for the contact member having the same hardness or substantially the same hardness as the contact member and lower than the contact member in glass transition temperature.

U.S. Pat. No. 4,585,323 issued Apr. 29, 1986 to Ewing et al. and U.S. Pat. No. 4,585,323 issued Apr. 29, 1986 to Reale disclose devices for neutralizing ozone, in which a metallic paint or film is used to prevent ozone generated by a coronode from damaging the photoreceptor of electrophotographic copying machines or printers.

U.S. Pat. No. 4,563,408 issued Jan. 7, 1986 to Lin et al. discloses an electrophotographic imaging member, which includes a conductive layer, a charge transport layer comprising an aromatic amine charge transport or hydrazone molecule in a continuous polymeric binder phase, and a contiguous charge generation layer comprising a photoconductive material, a polymeric binder and a hydroxyaromatic antioxidant. An electrophotographic imaging process using this member is also described.

U.S. Pat. No. 4,264,191 issued Apr. 28, 1981 to Gerbasi et al. describes a laminated doctor blade for removing excess marking material or other material from a surface. The blade comprises a relatively hard layer of a smooth tough material and a relatively soft layer of resilient material.

JP-02-176690 published Jul. 9, 1990 to Kimura discloses making electrophotographic sensitive body oxidation-resistant, to include by the use of antioxidant by providing a means for supplying the antioxidant to the surface of the sensitive body.

JP-04-73677 published Mar. 9, 1992 to Nagame et al. discloses maintaining the good quality of an image over a long time by cleaning while making a cleaning member which is mainly made of active carbon fiber always abut on a photosensitive body.

JP--05-210338 published Aug. 20, 1993 to Nagame, et al. discloses preventing image flowing caused by corona generated substance which is generated by corona discharge and to maintain a good-quality image over a long term by providing a means for applying a substance which complements the lowering of the surface resistance of a photosensitive body to the surface of the photosensitive body.

CROSS REFERENCE TO COPENDING APPLICATION

Copending Application Ser. No. 756,851, filed by Robert C. U. Yu on Nov. 26, 1996, entitled "PHOTORECEPTOR CLEANING/CONTAMINATION PREVENTION SYSTEM" (Attorney Docket No. D/94469I), a continuation in part application of Application Ser No. 274,065, filed by Robert C. U. Yu et al on Jul. 12, 1994 and issued as U.S. Pat. No. 5,610,699 on Mar. 11, 1997, entitled "PHOTORECEPTOR CLEANING APPARATUS AND METHOD" (Attorney Docket No. D/94469), corresponding published Japanese Application No. 08-054813, published Feb. 27, 1996—An apparatus for cleaning a charge retentive surface of a photoreceptor is disclosed which includes a cleaning blade or brush for removing debris from the charge retentive surface of a photoreceptor. In the environment of a xerographic copier and/or printer, corona effluents are emitted by the high voltage charging devices. These effluents, which are strong oxidizing/ozonating agents, may be adsorbed by or otherwise attach a cleaning blade, brush or corona-proximate polymer matrix device or housing. Thereafter, such corona species outgassing may chemically and/or otherwise attack the photoreceptor during prolonged proximate exposure or contact, resulting in print/copy defects, as well as permanent damage to the photoreceptor and/or cleaning blade, brush or other device. The present invention relates to impregnation or treatment with an antioxidant or antiozonant such that its presence in the polymer matrix can prevent corona species penetration or accumulation by chemically neutralizing and destroying the species upon exposure. Impregnation or treatment can be performed with a variety of antioxidant or antiozonant materials to hinder or eliminate the corona species absorption and accumulation so as to resolve corona species outgassing-related problems.

U.S. Pat. No. 5,610,699 and the related applications described above contain similar statements at the end of Working Example II or III (differences between the statements are in square brackets) that "While impregnation of [the] cleaning blades is described above as being completed after production of the blades (Example I [and II]), similar results may likewise be obtained by including antioxidants in the blade as part of the initial manufacturing/fabrication process according to other methods". It is clear from the context of the rest of the patent disclosure that this statement was intended to mean that the manufacturing of the elastomeric polyurethane blade was a batch process involving: (1) mixing and reacting a prepolymer of polyol with a di-isocyanate in a machine mixing head, (2) injecting the mixed component into a mold to form a crosslinked polyurethane long sheet having the exact blade thickness, (3) removing the polyurethane sheet from the mold, (4) subjecting the sheet to the swelling/deswelling antioxidant impregnation and drying processes to incorporate the antioxidant into the sheet, and (5) cut the resulting antioxidant treated sheet to give numbers of precise dimensions individual cleaning blade.

Thus, electrostatographic imaging systems with cleaning subsystems exhibit deficiencies which are undesirable in automatic, cyclic electrostatographic copiers, duplicators and printers.

SUMMARY OF THE INVENTION

It is, therefore, an object of the present invention to provide an electrostatographic imaging system with an improved cleaning subsystem which overcomes the above noted shortcomings.

It is another object of the present invention to provide an electrostatographic imaging member with an improved cleaning blade free of corona species absorption problems.

It is also another object of the present invention to provide an electrostatographic imaging member with an improved cleaning blade which does not cause band deletion in copy print-out.

It is still another object of the present invention to provide a process for fabricating an improved cleaning blade exhibiting all the advantages described above.

It is yet another object of the present invention to provide an improved cleaning blade capable of preventing oxidative damage to the surface of an electrostatographic imaging member.

It is a further object of the present invention to provide an electrostatographic imaging system including a subsystem for preventing oxidative damage to a charge retentive surface.

It is still another object of the present invention to provide a method for neutralizing oxidants on members proximate to charge retentive surfaces in a printing system.

These and other objects of the present invention are accomplished by providing a process for fabricating an electrostatographic cleaning member including forming a liquid mixture of a non-carbonaceous organic antioxidant uniformly distributed in a liquid prepolymer polyol, or in a liquid di-isocyanate, or in both the prepolymer polyol and the di-isocyanate, combining and reacting the prepolymer polyol with the di-isocyanate to form a cleaning member including a crosslinked thermoset polyurethane elastomer matrix reaction product in which the antioxidant is uniformly distributed.

Since the corona species which chemically attack the photoreceptor during contact of the blade with the photoreceptor or when the blade is brought in close proximity to the photoreceptor is a serious problem, preventive measures to lessen or eliminate the absorption and accumulation of the corona species in the blade polymer matrix are is urgently needed to resolve the problem. Because corona effluents generated by the high voltage charging device are strong oxidizing agents; the incorporation of small amounts of an antioxidant, particularly an antiozonant into the polymer matrix of a cleaning blade provides the blade with an added capability of being able to perform the function of corona scavenging through internal neutralization of absorbed corona species.

BRIEF DESCRIPTION OF THE DRAWINGS

The invention will be described with reference to the following drawings in which like reference numerals are used to refer to like elements.

DETAILED DESCRIPTION OF THE DRAWINGS

Figure 1:
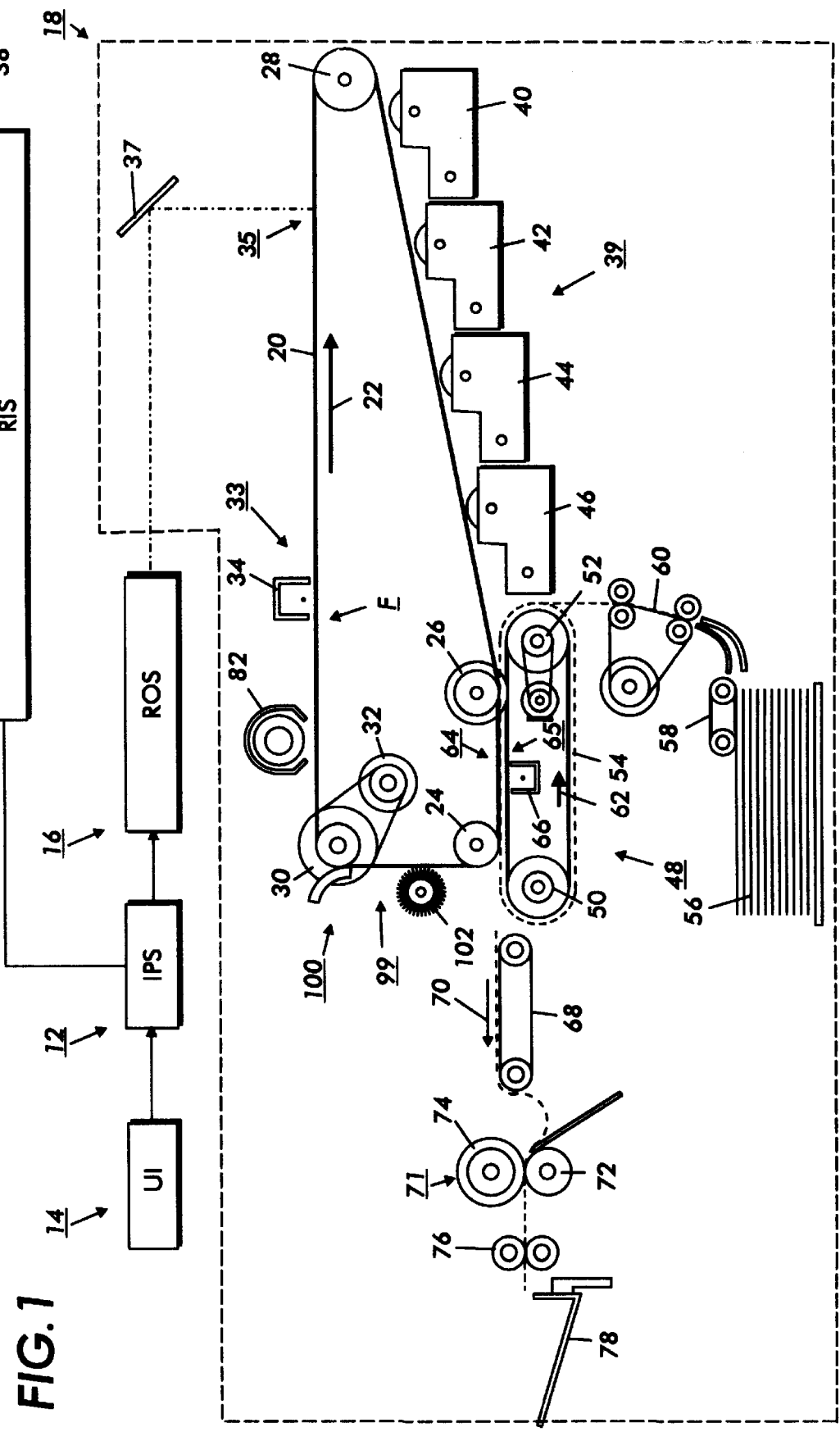
FIG. 1 is a schematic elevational view showing an exemplary electrophotographic imaging machine which incorporate the features of the present invention therein.

While the present invention will hereinafter be described in connection with preferred embodiments, it will be understood that it is not intended to limit the invention to a particular embodiment.

For a general understanding of the features of the present invention, reference is made to the drawings. In the drawings, like reference numerals have been used throughout to designate like elements. It will become evident from the following discussion that the present invention and the various embodiments set forth herein are suited for use in a wide variety of printing and copying systems, and are not necessarily limited in its application to the particular systems shown herein.

By way of a general explanation, FIG. 1 is a schematic elevational view showing an electrophotographic printing machine which incorporates features of the present invention therein. It will become evident from the following discussion that the present invention is equally well suited for use in a wide variety of copying and printing systems, and is not necessarily limited in its application to the particular system shown herein. As shown in FIG. 1, during operation of the printing system, a multiple color original document 38 is positioned on a raster input scanner (RIS), indicated generally by the reference numeral 10. The RIS contains document illumination lamps, optics, a mechanical scanning drive, and a charge coupled device (CCD array). The RIS captures the entire image from original document 38 and converts it to a series of raster scan lines and moreover measures a set of primary color densities, i.e. red, green and blue densities, at each point of the original document. This information is transmitted as electrical signals to an image processing system (IPS), indicated generally by the reference numeral 12. IPS 12 converts the set of red, green and blue density signals to a set of colorimetric coordinates.

IPS 12 contains control electronics which prepare and manage the image data flow to a raster output scanner (ROS), indicated generally by the reference numeral 16. A user interface (UI), indicated generally by the reference numeral 14, is in communication with IPS 12. UI 14 enables an operator to control the various operator adjustable functions. The operator actuates the appropriate keys of UI 14 to adjust the parameters of the copy. UI 14 may be a touch screen, or any other suitable control panel, providing an operator interface with the system. The output signal from UI 14 is transmitted to IPS 12. IPS 12 then transmits signals corresponding to the desired image to ROS 16, which creates the output copy image. ROS 16 includes a laser with rotating polygon mirror blocks. Preferably, a nine facet polygon is used. ROS 16 illuminates, via mirror 37, the charged portion of a photoconductive belt 20 of a printer or marking engine, indicated generally by the reference numeral 18, at a rate of about 400 pixels per inch, to achieve a set of subtractive primary latent images. ROS 16 will expose the photoconductive belt 20 to record three latent images which correspond to the signals transmitted from IPS 12. One latent image is developed with cyan developer material. Another latent image is developed with magenta developer material and the third latent image is developed with yellow developer material. These developed images are transferred to a copy sheet in superimposed registration with one another to form a multicolored image on the copy sheet. This multicolored image is then fused to the copy sheet forming a color copy.

With continued reference to FIG. 1, printer or marking engine 18 is an electrophotographic printing machine. Photoconductive belt 20 of marking engine 18 is preferably made from a polychromatic photoconductive material. The photoconductive belt 20 moves in the direction of arrow 22 to advance successive portions of the photoconductive surface sequentially through the various processing stations disposed about the path of movement thereof. Photoconductive belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt 20 is exposed three times to record three latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the compliment of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt 20 corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. (In FIG. 1, each developer unit 40, 42, 44 and 46 is shown in the operative position.) During development of each electrostatic latent image, only one developer unit is in the operative position, while the remaining developer units are in the nonoperative position. This ensures that each electrostatic latent image is developed with toner particles of the appropriate color without commingling.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 52. A sheet gripper (not shown in FIG. 1) extends between belts 54 and moves in unison therewith. A sheet is advanced from a stack of sheets 56 disposed on a tray. A friction retard feeder 58 advances the uppermost sheet from stack 56 onto a pre-transfer transport 60. Transport 60 advances a sheet (not shown in FIG. 1) to sheet transport 48. The sheet is advanced by transport 60 in synchronism with the movement of the sheet gripper. In this way, the leading edge of the sheet arrives at a preselected position, i.e. a loading zone, to be received by the open sheet gripper. The sheet gripper then closes securing the sheet thereto for movement therewith in a recirculating path. The leading edge of the sheet is secured releasably by the sheet gripper. As belts 54 move in the direction of arrow 62, the sheet moves into contact with the photoconductive belt 20, in synchronism with the toner image developed thereon. In transfer zone 64, a gas directing mechanism (not shown in FIG. 1) directs a flow of gas onto the sheet to urge the sheet toward the developed toner image on photoconductive belt 20 so as to enhance contact between the sheet and the developed toner image in the transfer zone. Further, in transfer zone 64, a corona generating device 66 charges the backside of the sheet to the proper magnitude and polarity for attracting the toner image from photoconductive belt 20 thereto. The sheet remains secured to the sheet gripper so as to move in a recirculating path for three cycles. In this way, three different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolor copy of the colored original document.

After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. The fusing station includes a heated fuser roll 74 and a pressure roll 72. The sheet passes through the nip defined by fuser roll 74 and pressure roll 72. The toner image contacts fuser roll 74 so as to be affixed to the sheet. Thereafter, the sheet is advanced by a pair of rolls 76 to a catch tray 78 for subsequent removal therefrom by the machine operator.

Figure 2:
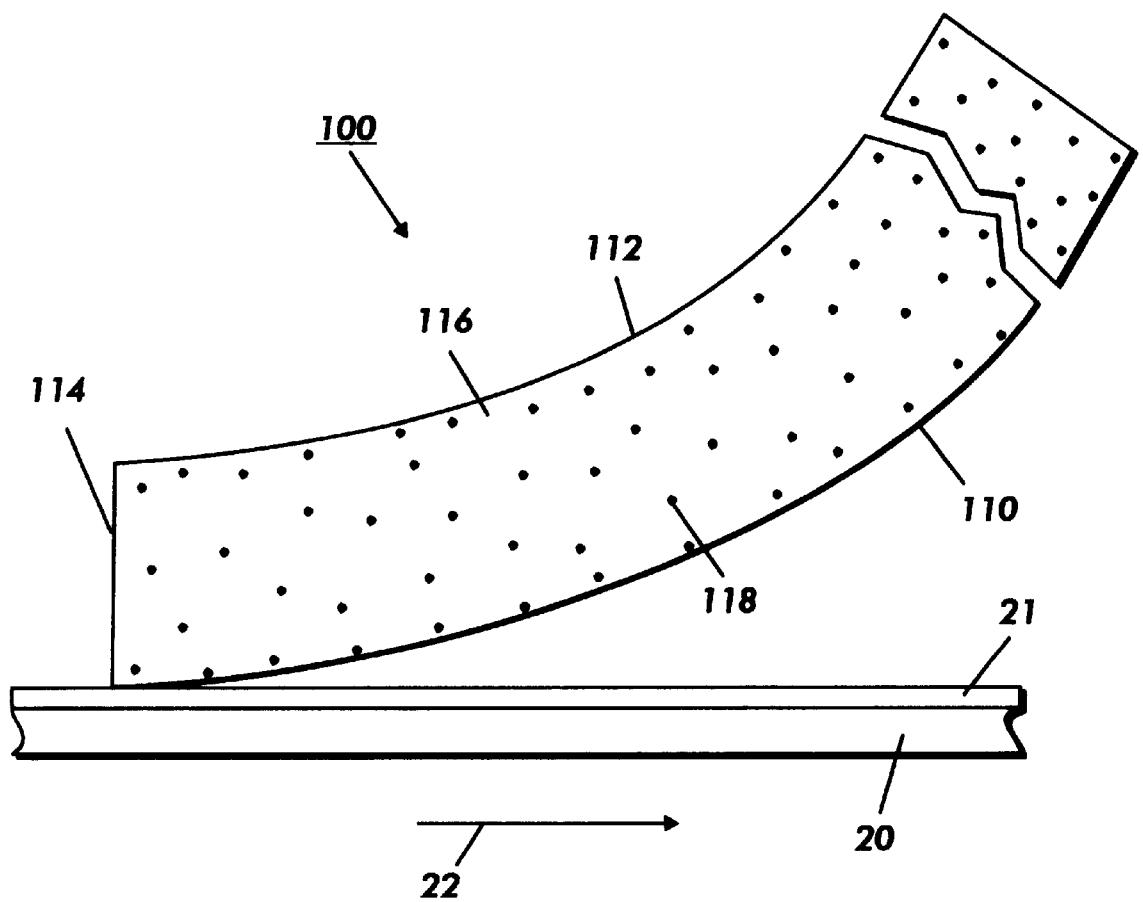
FIG. 2 is a cross-sectional view of a cleaning blade of the present invention.

The final processing station in the direction of movement of photoconductive belt 20, as indicated by arrow 22, is a photoreceptor cleaning station, indicated generally by the reference numeral 99, and as partially described in greater detail in association with FIGS. 1 and 2. Cleaning blade 100 may serve as the primary or backup means of toner and debris removal. Cleaning blade 100 is shown proximate to corona generating device 34 as well as other environmental (electrical, mechanical and/or chemical) problem sources such as are addressed by the cleaning blades of the present invention. Other aspects and embodiments of the photoconductor cleaning blades of the present invention, such as those as shown and described in association with FIGS. 1 and 2 and the relevant Examples below, may be employed for cleaning photoconductors. A rotateably mounted fibrous brush 102 (which may also include the oxidative contamination prevention system of the present invention) may be positioned in the cleaning station and maintained in contact with photoconductive belt 20 to preclean and remove residual toner particles remaining after the transfer operation. Thereafter, lamp 82 illuminates photoconductive belt 20 to remove any residual charge remaining thereon prior to the start of the next successive cycle.

FIG. 2 shows a photoreceptor cleaning blade 100 for removing residual toner and other debris from the charge retentive surface of layer 21 (shown in FIG. 2, on a flat portion of a flexible photoreceptor belt 20). Cleaning blade 100 is supported adjacent to photoreceptor belt 20 by a conventional mounting flange or member (not shown). Photoreceptor cleaning blade 100 of the present invention provides for the application of a desired uniformly dispersed pressure or contact force for cleaning photoreceptor belt 20. Photoreceptor cleaning blade 100 may be coupled with an elastomeric cleaning brush 102 as shown in FIG. 1, for removing residual toner and other debris from charge retentive layer 21. Cleaning brush 102 preferably includes a plurality of bristles, which must necessarily be constructed from a material that is softer than the charge retentive surface of photoreceptor 20 to prevent scratching or other damage to the charge retentive surface, and which may be provided with an antioxidant or antiozonant as described below. Cleaning blade 100 and cleaning brush 102 preferably extend across the width of photoreceptor 20, so as to cooperatively remove excess matter/debris from layer 21. Cleaning blade 100 is mounted to a supporting structure (not shown) so as to be held in place as shown in FIG. 1.

Photoconductors can comprise either a single layer or a multilayer belt structure, such as shown in FIG. 2, or a drum structure (not shown). A photoconductive layer (such as layer 21 of photoconductor 20 in FIG. 2) may be a homogeneous layer of a single material such as vitreous selenium or may be a composite of layers containing a photoconductor. The commonly used multilayered or composite structure contains at least a photogeneration layer, a charge transport layer and a conductive substrate. The photogeneration layer generally contains a photoconductive pigment and a polymeric binder. The charge transport layer (e.g., hole transport layer) contains a polymeric binder and charge transport molecules (e.g., aromatic amines, hydrazone derivatives, etc.). These organic, low ionization potential hole transport molecules as well as the polymeric binders are very sensitive to oxidative conditions arising from photochemical, electrochemical and other chemical reactions.

In copiers and printers, cleaning blades, brushes and other devices are frequently exposed to difficult environmental conditions, including light, charging devices such as corotrons, dicorotrons, scorotrons and the like, electric fields, oxygen, oxidants and moisture. Activated carbon and carbon black-containing (hereinafter "carbonaceous") materials, members and brushes (such as disclosed in U.S. Pat. No. 4,835,807, JP-04-73677 and the like) are known. Many materials contain carbon black and other carbonaceous additives; even toner includes carbon additives. The presence of these carbonaceous materials may add little or benefit in preventing oxidation and ozone contamination proximate to the photoconductors in electrophotographic printers. Undesirable chemical oxidative species are often formed during corona charging in xerographic imaging processes which may react with key organic components in the charge transport layer or photogeneration layer of the photoconductors. These unwanted chemical reactions can cause photoconductor degradation, poor charge acceptance and cyclic instability. Several types of reactive chemical species that are likely to be formed in the operational environment of a copier or an electronic printer include:

(a) Oxidants (e.g., peroxides, hydroperoxides, ozone, oxygen, selenium, selenium oxide, selenium alloys, arsenic oxide, vanadium oxide, VOPs and the like) may vary depending on the type of photoreceptor used.

(b) Both organic and inorganic radicals and diradicals (e.g., R, $RO_2$; $O_2$; $NO_2$; OH; and the like).

(c) Ionic species having positive (e.g., aromatic amine+) or negative (e.g., 0−) charges.

(d) Both singlet oxygen states (i.e., $^1O_2$ (Sigma$^+$g) and $^1O_2$ ($\Delta$g) can form through a sensitized photooxidation mechanism.

The foregoing chemical species can be generated from chemical, electrochemical and photochemical reactions as well as from the corona discharge in air by a charging device. The oxidative intermediates and their products can degrade the photoreceptor, cleaning blades and other components. If the cleaning blade in contact with photoreceptor degrades as a result of chemical and photochemical reactions, the photoreceptor becomes conductive (e.g., develops high dark decay) and exhibits regionalized print defects, poor charge acceptance, aging and stability deficiencies. Depending on the degree of damage, the photoreceptor degradation can lead to poor image quality, cycle-up, and cycle-down problems or even an inability of a copier or an electronic printer to produce a print. Belt or drum photoreceptors, in which ions, particulates and other harmful may fall from a charging device onto or near a cleaning blade/photoreceptor interface, can present a particularly oxidizing environment.

Referring to FIGS. 1 and 2, printer/copier inboard-outboard line print defects have been identified to be caused by corona species outgassing from the cleaning blade to chemically attack the photoconductor belt 20 (or a photoreceptor drum, not shown) at the area where cleaning blade 100 remains in contact with charge retentive layer 21 photoreceptor 20 during long period of time machine idling. This photoconductor damage is permanent, and will require that both the photoconductor and cleaning blade be replaced. Cleaning blade 100 includes a lower surface 110, an upper surface 112 and a lead edge 114; the intersection point of the lower surface 110 and lead edge 114 is the portion of the cleaning blade which most vigorously contacts charge retentive layer 21 of photoconductor 20. As photoreceptor 20 moves in direction 22, residual toner and other excess debris is removed from photoconductor 20. Antioxidant material 118 (shown in representative fashion in FIG. 1) is uniformly and molecularly dispersed throughout the polyurethane blade matrix material 116 of cleaning blade 100 during the blade formation process as described in the embodiment of a working Example of the present invention. To achieve satisfactory uniform distribution and sufficient concentration of antioxidant/antiozonant in the cleaning blade, brush, or other member in order to provide adequate corona species neutralization effect, the cleaning member preferably contains between about 0.0001 weight percent and about 5 weight percent of the antioxidant/antiozonant based on the total weight of the cleaning blade material. However, higher levels over about 5 percent by weight of antioxidant/antiozonant, based on the total weight of the cleaning blade material, may be acceptable where the mechanical properties of cleaning blade altered by the presence of high concentrations of antioxidant/antiozonant do not significantly affect the cleaning function of the blade.

The antioxidant(s) or antiozonant(s), examples of which are more fully described in Example III below, prevent damage to cleaning blade 100 and photoconductor 20. Cleaning blade 100 is fabricated to molecularly distribute the antioxidant or antiozonant material/agent in the polymer matrix in order to prevent photoconductor damage caused by the outgassing of corona species from the contacting blade during the idle stage of the imaging process. Cyclic print testing results (according to the Examples to follow) have shown that the cleaning blade of the present invention can neutralize the damaging outgassing effects so as to permit the cleaning blade to reach full photoreceptor life target without the onset of print defects and/or photoreceptor damage.

The antioxidant(s) or antiozonant(s) prevent corona species outgassing from a cleaning blade, by neutralizing those corona species. The blade having antioxidant or antiozonant incorporation thus prevents chemical, electrochemical or other corona species-related attack on the photoconductor during blade/photocoductor contact. This preventive measure minimizes or eliminates the corona species absorption and accumulation in the blade polymer matrix. Since corona effluents emitted by the high voltage charging device are strong oxidizing agents, uniformly incorporating an antioxidant or antiozonant in the molecular level throughout the cleaning blade polymer matrix can effectively prevent penetration or accumulation of corona species into the body of the blade by chemically neutralizing and/or destroying the species upon exposure. To recapitulate, various embodiments have been described of a photoconductor or intermediate transfer drum/roller cleaning system employing a cleaning blade or brush containing uniformly dispersed antioxidant in a polymer matrix for removal of residual toner and debris from the charge retentive surface of a photoconductor. Moreover, the system of the present invention described in relation to cleaning blade herein can be used to prepare a variety of other cleaning devices (such as polymeric cleaning brushes) or even non-cleaning related devices (such as a bias transfer rolls, housings, guide members or other devices) proximate to or in periodic or continuous contact with a photoconductor or intermediate transfer member to prevent those devices from contributing to corona species or other oxidative or ozone-related outgassing attacks on the photoconducor or intermediate transfer member. Specific examples include intermediate transfer belt 7, with housing 30 and bias transfer member 16 proximate to or in contact therewith as shown in FIG. 2 of U.S. Pat. No. 5,119,140, the entire disclosure thereof being incorporated herein by reference. This elimination of the root cause of corona species outgassing from the blade 100, brush 102 (both of FIG. 1 herein) or other device or housing proximate to the photoconductor or intermediate transfer member may be resolved by adopting the system of the present invention, as described more specifically in the blade-related Examples which follow.

Any suitable non-carbonaceous antioxidants or antiozonants of interest for the present invention application includes, for example, 1,3-diphenylisobenzofuran and N-penyl-2-naphthylamine; 2-tert-butyl-4-methyl phenol; 2-tert-butyl-5-methyl phenol; 2-tert-butyl-6 methyl phenol; 2,6-di-tert-butyl-4-methyl phenol; 1,4-diamino naphthalene; phenylene diamine; alpha tocopherol; N-tert-butyl-α-phenylnitrone; EDTA; N,N'-di-β-naphthyl-p-phenylenediamine; 2,2'-methylene bis(4-methyl-6-tert butyl phenol); N,N'-diphenyl-p-phenylenediamine; mono-octyl diphenylamine; dioctyl diphenylamine; monononyl diphenylamine; dinonyl diphenylamine; 4-isopropoxy diphenylamine; N,N'-di-β-naphthyl-p-phenylenediamine; N-phenyl-β-naphthylamine; N-phenyl-α-naphthylamine; N-cyclohexyl-N'-phenyl-p-phenylenediamine; 2,6di-tert-butyl-4-methyl phenol; 2-tert-butyl-4-methoxy phenol; beta-carotene; L-ascorbic acid 6-palmitate; propyl gallate; and the like. The expression "non-carbonaceous" antioxidants or antiozonants, as employed herein, is defined as organic antioxidants or antiozonants that are free of substantially pure carbon materials such as graphite, activated carbon, carbon fibers, and the like.

Any suitable reactants for forming crosslinkable elastomeric polyurethanes may be utilized for the electrostatographic cleaning member matrix of this invention. Crosslinkable elastomeric polyurethane reactants are well known and commercially available. A typical thermoset elastomeric polyurethane is prepared by reacting a stoichiometric amount of a prepolymer polyol and a di-isocyanate to form a three-dimensional crosslinked network. Polyols can be a hydroxyl terminated polyester, hydroxyl terminated polyether, and the like. Typical polyols include, for example, poly(oxyethylene)glycols, poly(oxypropylene)glycols, and the like. Typical di-isocyanates include, for example, toluene di-isocyanate, methyl di-isocyanate, and the like. Manufacturers of crosslinkable elastomeric polyurethane reactants include, for example, Mobay Chemical Co., Dow Chemical Company and E.I. du Pont de Nemours & Co. Since a typical thermoset elastomeric polyurethane cleaning blade is prepared by reacting a stoichiometric amount of a prepolymer polyol and a di-isocyanate to form a three-dimensional crosslinked network, as will be discussed below in one embodiment of the present invention, a scavenging cleaning blade was fabricated by first adding a predetermined amount of an antioxidant directly to the polyol component of the raw material prior to mixing the polyol and di-isocyanate together to give the elastomeric blade without altering the mechanical properties of the blade. The addition of an antioxidant or antiozonant directly to the polyol has been demonstrated in the embodiment of blade preparation in a working Example. However, the antioxidant or antiozonant may, alternatively, be added to the di-isocyanate component instead of the polyol prior to the mixing of polyol and di-isocyanate. If desire, the antioxidant or antiozonant may, instead, be separately added to both components of the polyurethane reactants. Since chemical reaction takes place quite rapidly as soon as the polyol is mixed with the di-isocyanate in the machine mixing head, it is not recommended to add the antioxidant or antiozonant after the mixing of these two reacting components during blade preparation. When tested in an actual machine, no print-out defects were observed in copies up to the targeted end of the a photoconductor belt service life of 18,000 print copies.

To achieve satisfactory uniform antioxidant distribution in the continuous blade matrix, a desirable range of antioxidant in the cleaning blade may be between about 0.0001 weight percent and about 5 weight percent, based on the total weight of the final cured composition. A loading level below 0.0001 weight percent will diminish the effectiveness of the antioxidant, while a level greater than 5 weight percent may alter the mechanical properties of the blade. A preferred loading level is from about 0.001 weight percent to about 2 weight percent, based on the total weight of the final cured composition. While, as discussed above, an optimum level is from about 0.002 weight percent to about 1 weight percent, based on the total weight of the final cured composition.

Although blending a liquid antioxidant with the liquid prepolymer polyol can easily be carried out by stirring, an antioxidant in powder form should be dissolved in a low boiling organic solvent, for example, methylene chloride, to assist mixing and facilitate homogeneous blending into the reactant component.

The invention will now be described in detail with respect to the specific preferred embodiments thereof; it being understood that the Examples given are intended to be illustrative only and that the invention is not intended to be limited to the materials, conditions, process parameters and the like recited herein. All parts and percentages are by weight unless otherwise indicated.

EXAMPLE I

UNTREATED CLEANING BLADE

An elastomeric polyurethane cleaning blade was prepared by reacting liquid components of a prepolymer polyol (HO ... OH) with a di-isocyanate crosslinker (O=C=N—R—N=C=O, where R is an aliphatic or aromatic functional) to form a crosslinked three-dimensional network elastomer. The crosslinking reaction, upon mixing the two liquid components, leads to the formation of a three-dimensional, thermoset polyurethane elastomer matrix reaction product, i.e., cleaning blade, which was then used as a control for comparison.

EXAMPLE II

An elastomeric polyurethane cleaning blade was prepared in the same manner according to Example I, with the exception that a small quantity of alpha tocopherol was stirred into the liquid prepolymer polyol prior to mixing the polyol with di-isocyanate to form the elastomeric polyurethane blade. The alpha tocopherol, which is vitamin E, available from Aldrich Chemical Company, Inc., is a non-volatile liquid antioxidant. Its presence in the cleaning blade material matrix, by means of the present preparation method, should impart to the blade a capability of scavenging and neutralizing absorbed oxidizing agents of corona species emitted from any charging device(s) during photoelectrical imaging and cleaning processes, thus eliminating the corona species photoreceptor attack problem altogether. The amount of alpha tocopherol incorporated into the body of the blade network was approximately 0.0067 weight percent, based on the total weight of the final cured composition. The addition of antioxidant alpha tocopherol in the elastomer cleaning blade was not seen to affect the shore A hardness, Young's modulus, stress-strain characteristic of the blade material, assuring the blade's proper cleaning capability.

In recapitulation, various embodiments of a photoreceptor or intermediate transfer drum/roller cleaning system employing an antioxidant uniformly distributed throughout the continuous matrix of a cleaning blade or brush which permits the removal of residual toner and debris from the charge retentive surface of a photoconductor have been described. Further, a system for providing and/or preparing a variety of devices (such as a bias transfer rolls, cleaning housings or other member) proximate to or in periodic or continuous contact with a photoreceptor or intermediate transfer member to prevent those devices from contributing to corona species or other ozone-related outgassing attacks on photoreceptor or intermediate transfer member has also been described.

Although the exemplary experimental demonstration outlined above focuses on alpha tocopherol, other antioxidants or antiozonants may also or alternatively be employed to achieve the invention result are, for example: 2-tert-butyl-4-methyl phenol; 2-tert-butyl-5-methyl phenol; 2-tert-butyl-6-methyl phenol; 2,6-bi-tert-butyl-4-methyl phenol; 1,4-diamino naphthalene; phenylene diamine; alpha tocopherol; N-tert-butyl-α-phenylnitrone; EDTA; N,N'-di-β-naphthyl-P-phenylenediamine; 2,2'-methylene bis (4-methyl-6-tert butyl phenol); N,N'-diphenyl-p-phenylenediamine; mono-octyl diphenylamine; dioctyl diphenylamine; monononyl diphenylamine; dinonyl diphenylamine; 4-isopropoxy diphenylamine; N,N'-di-β-naphthyl-p-phenylenediamine; N-phenyl-β-naphthylamine; N-phenyl-α-naphthylamine; N-cyclohexyl-N'-phenyl-p-phenylenediamine; and the like and mixtures thereof.

EXAMPLE III

The polyurethane cleaning blade of Examples I and II were each tested in extended duration trials in a xerographic printer/copier. The standard testing procedures included a total daily copy volume of 800 to 1000 copies per day. At the beginning and end of each day a 30 percent solid area coverage halftone pattern was made to observe the condition of the photoreceptor with respect to cleaning blade lines. The test environment was lab ambient and allowed to fluctuate through a normal office daily cycle of approximately 68° F./40% RH to approximately 75° F./50% RH. The untreated blade of Example I was again seen to cause the development of a band of print defect in copies corresponding to the location where blade make idle contact after only 2,000 prints. By contrast, the blade containing the antioxidant of Example II showed no noticeable print defects after reaching an exemplary photoreceptor target life of 18,000 prints, thus demonstrating the total effectiveness of the present invention approach to eliminate the problem. Very importantly, the presence of antioxidant in the blade did not affect the blade cleaning efficiency, and specifically, did not change the Young's modulus, hardness, flexibility, and dynamic mechanical properties of these blades.

While the present invention has been illustrated and described in detail in the drawings and foregoing description, additional advantages and modifications will readily occur to those having ordinary skill in the art. The invention in its broader aspects is therefore not limited to the specific details, representative apparatus, and illustrative examples shown and described. Thus, various modifications and variations can be made to the present invention without departing from the scope or spirit of the present invention, and it is intended that the present invention cover the modifications and variations provided they come within the scope of the appended claims and their equivalents.

What is claimed is:

1. A process for fabricating an electrostatographic member in the shape of a cleaning blade comprising forming a liquid mixture of a non-carbonaceous organic antioxidant or antiozonant uniformly distributed in a liquid polyester polyol, or in a liquid di-isocyanate, or in both the polyester polyol and the di-isocyanate, combining and reacting the polyester polyol with the di-isocyanate to form a member comprising a continuous crosslinked thermoset polyurethane elastomer matrix reaction product in which the antioxidant or antiozonant is uniformly distributed in a concentration of between about 0.0001 weight percent and about 5 weight percent of antioxidant, based on the total weight of the member.

2. A process according to claim 1 wherein the member comprises between about 0.001 weight percent and about 2 weight percent of antioxidant or antiozonant, based on the total weight of the member.

3. A process according to claim 1 wherein the member comprises between about 0.002 weight percent and about 1 weight percent of antioxidant or antiozonant, based on the total weight of the member.

4. A process according to claim 1 wherein the antioxidant or antiozonant is alpha tocopherol.

5. A process according to claim 1 wherein the antioxidant or antiozonant is 1,3-diphenylisobenzofuran.

6. A process according to claim 1 wherein the antioxidant or antiozonant is N-phenyl-2-naphthylamine.

7. A process according to claim 1 wherein the forming of a liquid mixture of a non-carbonaceous organic antioxidant or antiozonant includes dissolving an antioxidant or antiozonant powder in a solvent prior to uniformly distributing the antioxidant or antiozonant in a liquid polyester polyol, or in a liquid di-isocyanate, or in both the polyester polyol and the di-isocyanate.

* * * * *